United States Patent
Li et al.

(10) Patent No.: US 9,231,637 B2
(45) Date of Patent: Jan. 5, 2016

(54) ADAPTIVE DC OFFSET CANCELLATION FOR DIRECT CONVERSION RF RECEIVERS

(71) Applicant: Aviacomm Inc., Sunnyvale, CA (US)

(72) Inventors: Tao Li, Campbell, CA (US); Hans Wang, Mountain View, CA (US); Binglei Zhang, San Jose, CA (US); Shih Hsiung Mo, San Jose, CA (US)

(73) Assignee: AVIACOMM INC., Sunnyvale, CA (US)

( * ) Notice: Subject to any disclaimer, the term of this patent is extended or adjusted under 35 U.S.C. 154(b) by 220 days.

(21) Appl. No.: 14/085,236

(22) Filed: Nov. 20, 2013

(65) Prior Publication Data

US 2014/0148114 A1   May 29, 2014

Related U.S. Application Data

(60) Provisional application No. 61/730,340, filed on Nov. 27, 2012.

(51) Int. Cl.
*H04L 25/10* (2006.01)
*H04B 1/30* (2006.01)

(52) U.S. Cl.
CPC ............ *H04B 1/30* (2013.01); *H04B 2001/305* (2013.01)

(58) Field of Classification Search
CPC ................... H03F 3/45475; H03D 2200/0047; H04W 52/52
USPC .......... 327/307, 306; 375/297, 320, 340, 319; 455/232.1, 230, 130, 136
See application file for complete search history.

(56) References Cited

U.S. PATENT DOCUMENTS

| | | | | |
|---|---|---|---|---|
| 6,148,047 A * | 11/2000 | Mohindra | ............. | H04L 27/142 329/320 |
| 6,504,884 B1 * | 1/2003 | Zvonar | ................ | H04L 25/0212 375/285 |
| 6,717,995 B2 * | 4/2004 | Zvonar | ................ | H04L 25/0212 375/340 |
| 6,993,091 B2 * | 1/2006 | Ratto | .................... | H04L 27/364 375/297 |
| 7,164,901 B2 * | 1/2007 | Zheng | .................... | H03D 3/008 375/320 |
| 8,218,686 B1 * | 7/2012 | Timofeev | ............. | H04L 25/062 327/307 |
| 8,526,541 B1 * | 9/2013 | Timofeev | ............. | H04L 25/062 327/307 |

* cited by examiner

*Primary Examiner* — Sonny Trinh
(74) *Attorney, Agent, or Firm* — Shun Yao; Park, Vaughan, Fleming & Dowler LLP (57) ABSTRACT

One embodiment of the present invention provides a system for performing DC offset cancellation for a wireless receiver that includes one or more amplification stages between a demodulator and a baseband digital signal processor (DSP). During operation, the system calibrates values of static DC offset associated with a plurality of gain settings for at least one amplification stage, stores the calibrated DC offset values in a lookup table, receives a current gain setting for the amplification stage, maps a DC offset value from the lookup table based on the current gain setting, and cancels static DC offset for the amplification stage using the mapped DC offset value.

17 Claims, 7 Drawing Sheets

ADAPTIVE DC OFFSET CANCELLATION FOR DIRECT CONVERSION RF RECEIVERS

RELATED APPLICATION

This application claims the benefit of U.S. Provisional Application No. 61/730,340, entitled "Adaptive DC Offset Cancellation (DCOC) for Direct Conversion RF Receiver," by inventors Tao Li, Hans Wang, Binglei Zhang, and Shih Hsiung Mo, filed 27 Nov. 2012.

BACKGROUND

1. Field

The present disclosure relates generally to a direct conversion RF receiver. More specifically, the present disclosure relates to a direct conversion RF receiver equipped with an adaptive DC offset cancellation (DCOC) circuitry.

2. Related Art

Traditional wireless communication systems are usually designed for a specific standard, such as GSM (Global System for Mobile Communications), Wideband Code Division Multiple Access (W-CDMA), Wi-Fi® (registered trademark of Wi-Fi Alliance of Austin, Tex.), LTE (Long Term Evolution), just to name a few. Current demand for the convergence of wireless services, so that users can access different standards from the same wireless device, is driving the development of multi-standard and multi-band transceivers, which are capable of transmitting/receiving radio signals in the entire wireless communication spectrum (most are in a frequency range of from 300 MHz to 3.6 GHz).

A direct-conversion receiver (DCR) directly demodulates an RF (radio frequency) modulated carrier to baseband frequencies. This is in contrast to the standard super-heterodyne receiver where an initial conversion to an intermediate frequency (IF) is needed. The simplicity of performing only a single frequency conversion reduces the basic circuit complexity, and is thus preferable for meeting the multi-band/multi-standard requirement where high-density integrated circuits (ICs) are needed.

However, one of the major challenges facing the implementation of the DCRs is the DC offset issue. In a standard DCR architecture, RF band selection is typically the only filtering performed in the receive path before the signal is down-converted directly to baseband. Therefore, a strong, nearby signal, including the receiver's own local oscillator (LO) signal, can mix itself down to zero-IF, which is known as self-mixing, and generate a DC level that appears as interference at the center of the desired band. This self-mixing is often caused by signal leakages resulting from finitely isolated substrate and bond-wire coupling. For example, in the typical silicon-based IC, port-to-port isolation (such as the isolation between the LO and RF ports of a mixer) is limited by low-resistivity substrate coupling, bond-wire radiation, and capacitive and magnetic coupling. In addition, since the LO is typically a strong signal, it can leak with sufficiently high amplitude through these unintended paths, reaching into the mixer RF input and mixing with itself, thereby generating a static DC level. The LO signal can also be radiated by the antenna, or reflected off obstructions (such as a building or a moving vehicle), and then be recaptured by the front-end and generate a DC offset. With fading and multipath reception, the received power level can vary rapidly, which results in time-varying or dynamic DC offset. In addition, DC offset can be generated by self-mixing of a strong nearby interferer or interaction of an interfering signal and circuit generated second-order nonlinearity.

SUMMARY

One embodiment of the present invention provides a system for performing DC offset cancellation for a wireless receiver that includes one or more amplification stages between a demodulator and a baseband digital signal processor (DSP). During operation, the system calibrates values of static DC offset under a plurality of gain settings for at least one amplification stage, stores the calibrated DC offset values in a lookup table, receives a current gain setting for the amplification stage, maps a DC offset value from the lookup table based on the current gain setting, and cancels static DC offset for the amplification stage using the mapped DC offset value.

In a variation on this embodiment, calibrating the values of static DC offset is performed when the wireless receiver is powered on, in an absence of incoming RF signals at the at least one amplification stage's input.

In a variation on this embodiment, the system receives incoming RF signals, and continuously performs a dynamic DC offset cancellation operation in a presence of the received RF signals.

In a further variation, performing the dynamic DC offset cancellation involves forming a closed loop that includes one or more amplification stages closest to the baseband DSP.

In a variation on this embodiment, calibrating the values of the static DC offset involves forming a closed loop using a DC offset cancellation circuit and the at least one amplification stage. The DC offset cancellation circuit is configured to: receive an output from the at least one amplification stage, generate a DC offset cancellation signal based on the output received from the at least one amplification stage, and feed the generated DC offset cancellation signal to an input of the amplification stage.

In a further variation, while generating the DC offset cancellation signal, the DC offset cancellation circuit is further configured to: determine whether the output received from the at least one amplification stage is approximately zero, and in response to the output not being approximately zero, update the DC offset cancellation signal.

In a variation on this embodiment, the wireless receiver is a direction-conversion receiver.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a solution for DC offset cancellation. More specifically, a DC offset cancellation (DCOC) circuitry that includes a comparator and a digital logic is used to track static DC offset during an initial DC offset calibration process. The calibration result is stored in a lookup table. During normal operation, the DCOC control logic searches the lookup table for proper values to cancel the static DC offset. In addition, the dynamic DC offset is cancelled by tracking the DC offset while receiving RF input and using the tracking result from the receiver baseband DSP to set a proper dynamic DCOC value.

Static DC Offset Cancellation

Figure 1:
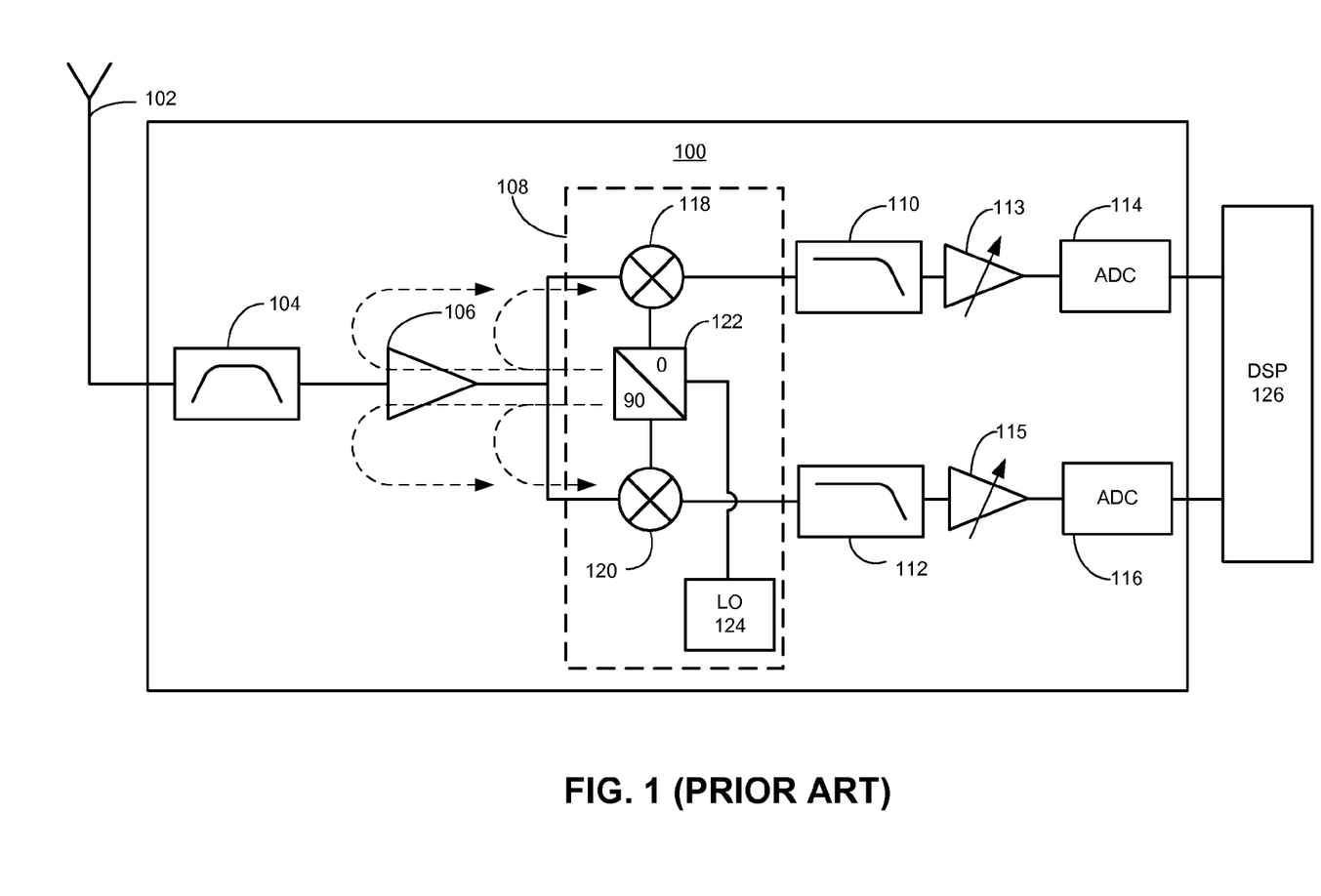
FIG. 1 presents a diagram illustrating the architecture of a conventional direct-conversion receiver (prior art).

FIG. 1 presents a diagram illustrating the architecture of a conventional direct-conversion receiver (prior art). In FIG. 1, direct-conversion receiver 100 includes a band-pass filter (BPF) 104, an amplifier 106, an IQ (in-phase quadrature) demodulator 108, low-pass filters (LPFs) 110 and 112, variable gain amplifiers (VGAs) 113 and 115, and analog-to-digital converters (ADCs) 114 and 116. IQ demodulator 108 includes mixers 118 and 120, 90°/0° phase shifter 122, and local oscillator (LO) 124.

During operation, incoming RF signals received via an antenna 102 are filtered and amplified by BPF 104 and low-noise amplifier (LNA) 106, respectively. In one embodiment, BPF 104 is tunable, and depending on the standard (such as GSM or W-CDMA) that is currently active, BPF 104 provides filtering at the desired RF frequency band. In one embodiment, BPF 104 includes a group of BPFs, each corresponding to a particular frequency band. Depending on the standard, one of the BPFs is selected to filter the desired RF signal. Subsequently, the filtered RF signal is directly down-converted to in-phase (I) and quadrature (Q) baseband signals by IQ demodulator 108. Note that LO 124 is applied to I and Q mixers 118 and 120 at the same carrier frequency as the desired signal, thus generating the sum and difference frequencies at the baseband I and Q output ports. LPFs 110 and 112 heavily reject the summation frequency and allow only signals at the difference frequency (the baseband signals) to pass. VGAs 113 and 115, or various stages of VGAs, amplify the I and Q baseband signals before ADCs 114 and 116 convert them to the digital domain. The digital baseband signals are then sent to a baseband digital signal processor (DSP) 126 for further processing.

In FIG. 1, the dashed arrows illustrate possible LO leakage paths. The LO signal can reflect off the output of LNA 106 back into the input of mixers 118 and 120, or in a worsened situation, the LO signal can leak back to the input of LNA 106 and is amplified by LNA 106 before reaching mixers 118 and 120. The LO leakage signal can then mix with the normal LO signal, thus causing the outputs of mixers 118 and 120 to include zero-frequency or DC components.

Note that although DC offset is not unique for direct-conversion receivers, the high gain (as provided by various stages of VGAs, such as VGAs 113 and 115) in the baseband block of a direct-conversion receiver makes the DC offset problem more severe. More specifically, the high and widely varied gain in the baseband block makes the calibration of the DC offset difficult because after the various amplification stages the DC offset may be too large to be calibrated and it can vary with gain settings. For example, a 60 dB gain in the baseband block may cause a 200 µV DC offset at the output of mixers 118 and 120 to become a 200 mV DC signal (excluding the DC offset generated by the baseband block). Such a large DC level can easily saturate the baseband output stage or reduce the ADC resolution significantly. Hence, it is essential to remove or cancel the DC offset in DCRs.

Figure 2A:
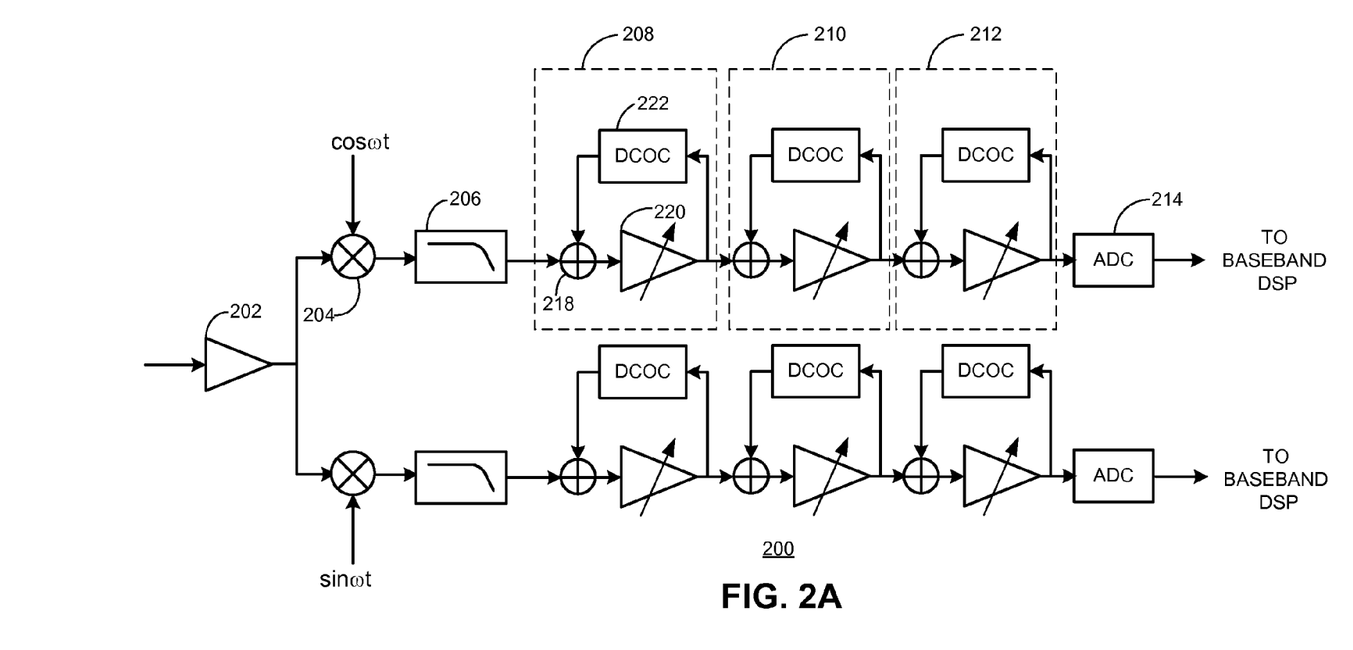
FIG. 2A presents a diagram illustrating an exemplary direct-conversion receiver with static DC offset calibration/cancellation circuits, in accordance with an embodiment of the present invention.

Because the DC offset in DCRs is closely related to the gain settings in the baseband block, it can be calibrated for different gain settings, and the DC offset calibration results can be used to cancel the DC offset each time the gain changes. The DC offset calibration can be part of the initialization process performed when the DCR is powered on. In one embodiment, the DCR maintains a table that lists all possible gain settings, and calibrates the DC offset for each gain setting when the DCR is powered on. FIG. 2A presents a diagram illustrating an exemplary direct-conversion receiver with static DC offset calibration/cancellation circuits, in accordance with an embodiment of the present invention.

Note that, for simplicity, certain standard receiver components, such as the antenna, the baseband DSP, the LO, and the phase shifter, are not shown in FIG. 2A. In FIG. 2A, DCR 200 includes an LNA 202 and I and Q signal branches for IQ demodulation. Each branch includes a mixer (such as a mixer 204), an LPF (such as LPF 206), a number of amplification-and-DCOC blocks (such as blocks 208, 210, and 212), and an ADC (such as ADC 214). Each amplification-and-DCOC block includes an adder, a variable gain amplifier (VGA), and a DCOC circuitry. For example, amplification-and-DCOC block 208 includes an adder 218, a VGA 220 and a DCOC circuitry 222. Although exemplary receiver 200 in FIG. 2A includes three amplification-and-DCOC blocks, note that, in practice, receiver 200 can include more or fewer such blocks.

During operation, a DCOC circuitry can output a DC signal to an adder at the amplifier input, thus cancelling any potential DC offset existing at the input of the VGA. Note that because any residual DC offset can be amplified by a VGA, in some embodiments, each amplification stage is coupled to a DCOC circuitry to ensure sufficient DC offset cancelation. In the example shown in FIG. 2A, the output of mixer 204 is first filtered by LPF 206, which rejects higher frequency signals (such as signals at the summation frequency) and allows only lower frequency signals (such as baseband signals at the difference frequency and DC offset signals) to pass. As a result, in addition to the desired baseband signals, the DC offset will show up at the input of adder 218. The output of DCOC circuitry 222, which can be a positive or negative DC signal, is also inputted to adder 218. Ideally, the DC output of DCOC circuitry 222 completely cancels out any DC offset at the input of VGA 220. In practice, there may be residual DC signals that are amplified by VGA 220 and reach the next amplification stage. Hence, DCOC at each amplification stage can significantly reduce overall DC offset. To achieve perfect or near perfect DC offset cancellation, each DCOC circuitry needs to output a DC signal at a proper level. In one embodiment, the output of the DCOC circuitry is pre-calibrated for each gain setting, and such a calibration process is often performed when the receiver is powered on, in an absence of an RF input signal. In other words, such a calibration process is performed when LNA 202 has no RF input.

Figure 2B:
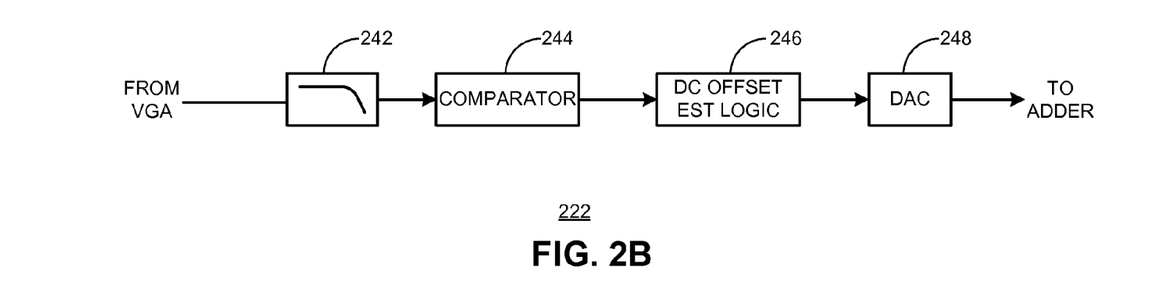
FIG. 2B presents a diagram illustrating an exemplary DC offset cancellation circuitry, in accordance with an embodiment of the present invention.

FIG. 2B presents a diagram illustrating an exemplary DC offset cancellation circuitry, in accordance with an embodiment of the present invention. DCOC circuitry 222 includes an LPF 242, a comparator 244, a digital logic (such as a DC offset estimation logic) 246, and a digital-to-analog converter (DAC) 248. As shown in FIG. 2B, LPF 242 receives input from the output of a VGA. While operating in the calibration mode, there is no RF input, and the output of the VGA includes amplified DC offset and other noises. LPF 242 filters out other higher frequency noises and allows the amplified DC offset (and certain low-frequency noise) to reach the input of comparator 244, which compares the amplified DC offset with a zero-biased or ground level signal. In one embodiment, comparator 244 is an analog voltage comparator or thresholder, and has a single-bit output. If the output of LPF 242 is above ground level, comparator 244 outputs "1;" otherwise, comparator 244 outputs "0." The output of comparator 244 is sent to digital logic 246, which adjusts its DC offset cancellation estimation accordingly. Note that the DC offset cancellation estimation maintained by digital logic 246 is in a digital form, and DAC 248 is responsible for converting the digital value of the DC offset estimation into an analog DC signal before feeding the analog DC signal to the adder in front of the VGA.

Note that the output of comparator 244 indicates whether there is DC offset or the amount of DC offset presence at the VGA input. For example, if the output of comparator 244 is "1," it means that the VGA output and, thus the VGA input, is higher than the ground level. In other words, the sum of the DC offset and the current output of DCOC circuitry 222 is positive. In order to cancel the DC offset, the current output of DCOC circuitry 222 needs to be adjusted in a direction that lowers the sum of the DC offset and the output of DCOC circuitry 222. Hence, digital logic 246 updates the digital value of the DCOC estimation accordingly. After the digital value of the DCOC estimation is updated, DAC 248 converts the updated digital value to an analog DC signal, which is again fed to adder 218 to be combined with the DC offset. The combined signal is then amplified by the VGA and compared with a ground level signal at comparator 244. If the output of comparator 244 remains positive, meaning that the adjustment to the DCOC estimation is not sufficient, digital logic 246 needs to adjust the DCOC estimation value in the same direction. On the other hand, if the current output of comparator 244 is "0," it suggests that digital logic 246 overshoots in its adjustment of the DCOC estimation, causing the sum of the DC offset and the adjusted DCOC output to be negative. To correct the overshoot, digital logic 246 now needs to adjust the DCOC estimation value in the opposite direction. This process iterates until the output of the filtered output of the VGA is approximately zero, meaning that the DC offset at the VGA input has been cancelled.

Note that, due to the existence of random noise, such as thermal noise, the input to the VGA (and thus the filtered output of the VGA) often fluctuates, thus resulting in uncertainty in the output of comparator 244. Even at near perfect DCOC, where the sum of the DC offset and the DCOC output approaches zero, the output of comparator 244 can still fluctuate between "1" and "0." Therefore, a single comparison output is insufficient in determining whether the output of the VGA is above or below ground level. In one embodiment, a statistical approach is used to determine whether a current DCOC output sufficiently cancels the DC offset. To do so, for each DCOC estimation, multiple comparisons are made at comparator 244, and a counter (not shown in FIG. 2B) is used to count the number of "1"s and "0"s outputted by comparator 244. If there are more "1"s than "0"s, the VGA output is most likely above the ground level; if there are more "0"s than "1"s, the VGA output is most likely below the ground level; and if there is a even split between "1"s and "0"s, the VGA output is approximately at the ground level. In one embodiment, digital logic 246 includes a control logic that is configured to maintain each DCOC output level for a predetermined time duration, periodically read the output of comparator 244 within the predetermined time duration, and make a decision on whether to update the DCOC estimation value based on the number of "1"s and "0"s outputted by comparator 244. For example, digital logic 246 may maintain a DCOC output level for one second, periodically read the output of comparator 244 10 times during the one second time duration, and count how many "1"s and "0"s in the 10 readings. If there are more "1"s or more "0"s, digital logic 246 adjusts the DC estimation value, and thus the DCOC output level, and starts a new one second cycle for reading the output of comparator 244. This process repeats itself until digital logic 246 determines that the VGA output is approximately zero based on there being an even split between the number of "1"s and "0"s outputted by comparator 244. In a further embodiment, digital logic 246 may determine whether the VGA output is approximately zero within an error margin. In the example above where the output of comparator 244 is read 10 times, digital logic 246 may determine that a 6/4 split between "1"s and "0"s is close enough to an even split, and stop updating the DCOC estimation once a 6/4 split is achieved. Note that the predetermined time duration for obtaining multiple readings of the comparator output can be determined by the settling time of LPF 242. The longer the settling time, the longer the time duration during which the DCOC output is kept at a certain level and the output of comparator 244 is read multiple times.

Once digital logic 246 determines that the VGA output is approximately zero, it saves the current DCOC estimation value, which is the calibrated DCOC value for the current gain setting, which can include the amount of gain at each amplification stage. Note that for cascaded amplification-and-DCOC stages, as in the example shown in FIG. 2A, the DCOC calibration is performed sequentially. Under each gain setting, the system first calibrates DCOC for the foremost amplification-and-DCOC stage, and then calibrates the following stages one by one. In the example shown in FIG. 2A, the system first performs DCOC calibration for block 208 by ensuring that the output of VGA 220 is approximately 0. Subsequently, the system calibrates the next amplification-and-DCOC block 210. Once calibration for block 210 is finished, the system calibrates the last amplification-and-DCOC stage, block 212, thus completing the DCOC calibration for the current gain setting. To calibrate DCOC for all possible gain settings provided by the receiver gain table, the system performs this calibration process for each gain setting, and stores the calibration results in a DCOC lookup table (LUT). Note that a typical entry in the DCOC LUT may include a gain setting (which lists gains at each amplification stage) and calibrated DCOC values (in digital domain) at each amplification stage for that gain setting.

Figure 3:
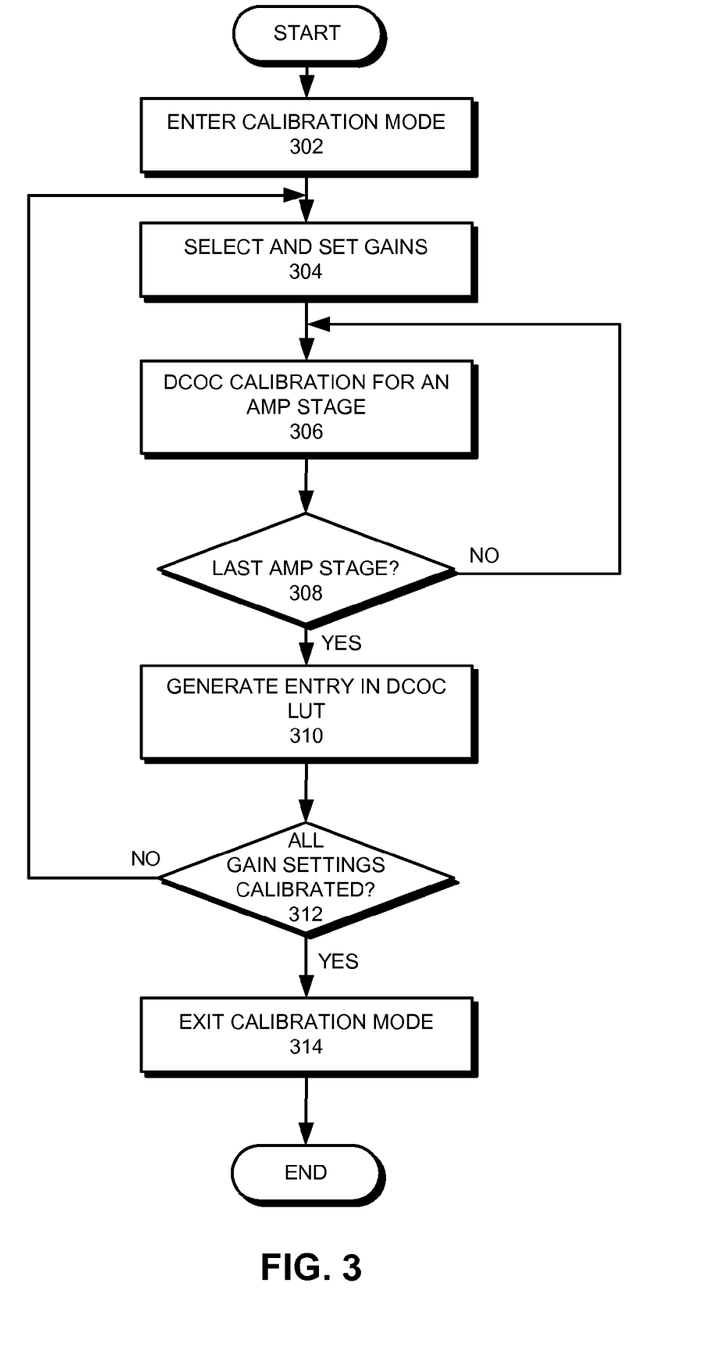
FIG. 3 presents a flowchart illustrating an exemplary process for an initial DCOC calibration, in accordance with an embodiment of the present invention.

FIG. 3 presents a flowchart illustrating an exemplary process for an initial DCOC calibration, in accordance with an embodiment of the present invention. When the receiver is powered on, the system enters calibration mode (operation 302). While in the calibration mode, the system selects and sets the current gain setting based on a gain table maintained by the receiver (operation 304). In one embodiment, the system selects and set the gains to minimum values when the calibration first started. The gain setting specifies the gains or the operating current at each amplification stage. Under the current gain setting, the system performs DCOC calibration for an amplification stage (operation 306), and determines if this amplification stage is the last amplification stage prior to the ADC, which converts received signals from the analog to the digital domain (operation 308). If the calibrated amplification stage is not the last amplification stage, the system performs DCOC calibration for the next amplification stage by returning to operation 306. If, however, the calibrated amplification stage is the last amplification stage, the system generates an entry in a lookup table, specifying the current gain setting the DCOC calibration outcomes (operation 310), and determines whether calibration has been performed for all gain settings in the gain table (operation 312). If so, the system exits the calibration mode (operation 314). If not, the system returns to operation 304 by selecting and setting gains of all amplifiers using a next entry in the gain table (operation 304).

Figure 4:
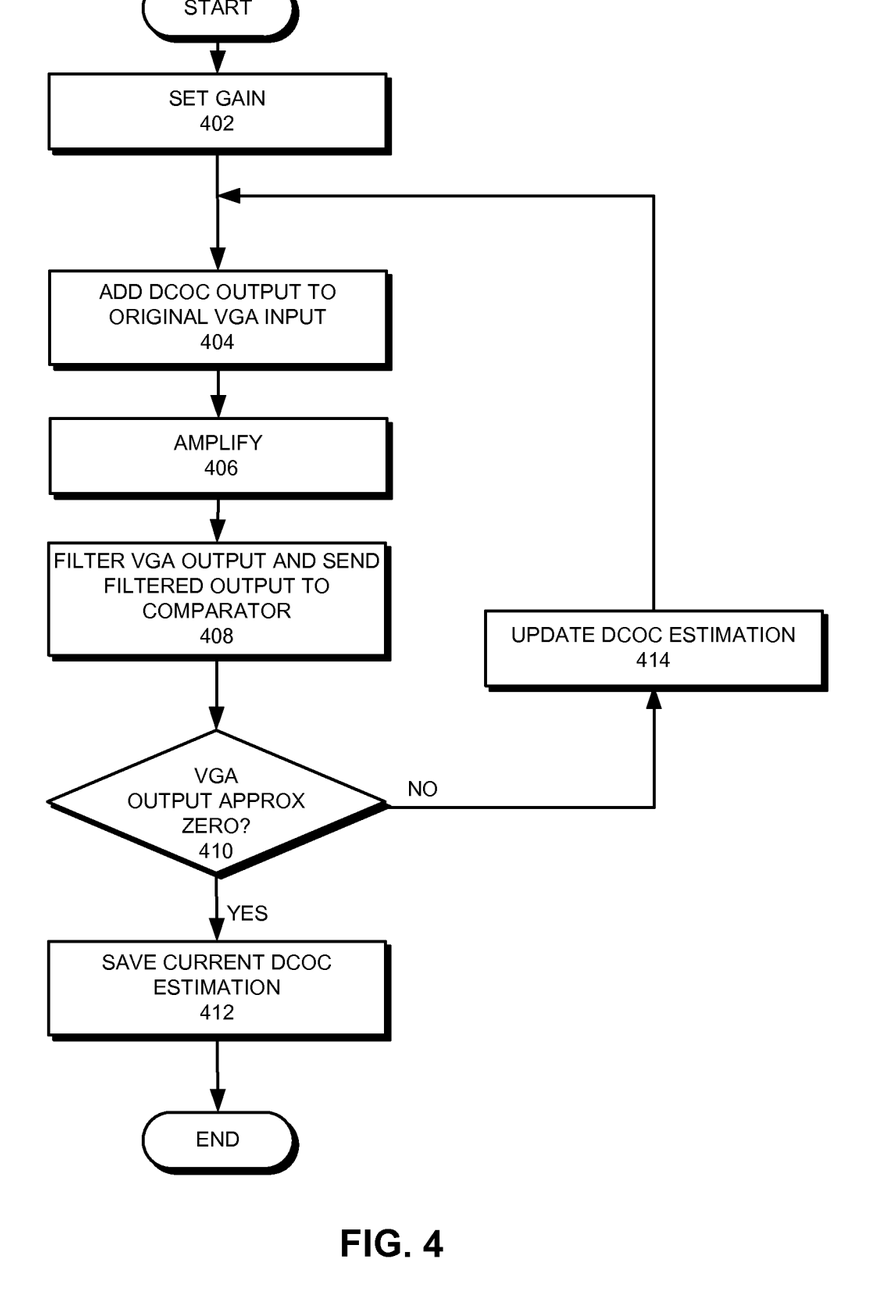
FIG. 4 presents a flowchart illustrating an exemplary process for calibrating DCOC for an amplification stage under a gain setting, in accordance with an embodiment of the present invention.

FIG. 4 presents a flowchart illustrating an exemplary process for calibrating DCOC for an amplification stage under a gain setting, in accordance with an embodiment of the present invention. When performing the DCOC, the gain of a VGA is set at a certain level (operation 402). At the input of the VGA, the output of a DCOC circuitry is added to the original VGA input (operation 404). Note that the original VGA input refers to VGA input signals coming from the previous stage, which can be a filter or an amplifier output. In one embodiment, the DCOC circuitry includes a digital control logic which outputs a digital DCOC estimation value, and an ADC which converts the digital value to an analog DC signal, which is the output of the DCOC circuitry. The sum of the original VGA input and the DCOC output is then amplified by the VGA (operation 406). The VGA output is then filtered and sent to a comparator (operation 408). The system then determines, based on the comparator output, whether the current VGA output is approximately zero (operation 410). Note that the filtered VGA output is a direct indication of DC offset. The larger the filtered VGA output, the larger the DC offset, and vice versa. In one embodiment, the comparator is a thresholder, and the VGA output is compared with the ground level. In a further embodiment, the system reads the output of the comparator multiple times within a predetermined time duration and counts the number of "1"s and "0"s. In an alternative embodiment, the comparator can output multiple bits that indicate the difference between the current VGA output and the ground level. If the system determines that the current VGA output is approximately zero, the system then saves the current digital DCOC estimation value (operation 412). Otherwise, the system updates the DCOC estimation value (operation 414), and the updated DCOC estimation is summed with the original VGA input (operation 404).

Figure 5:
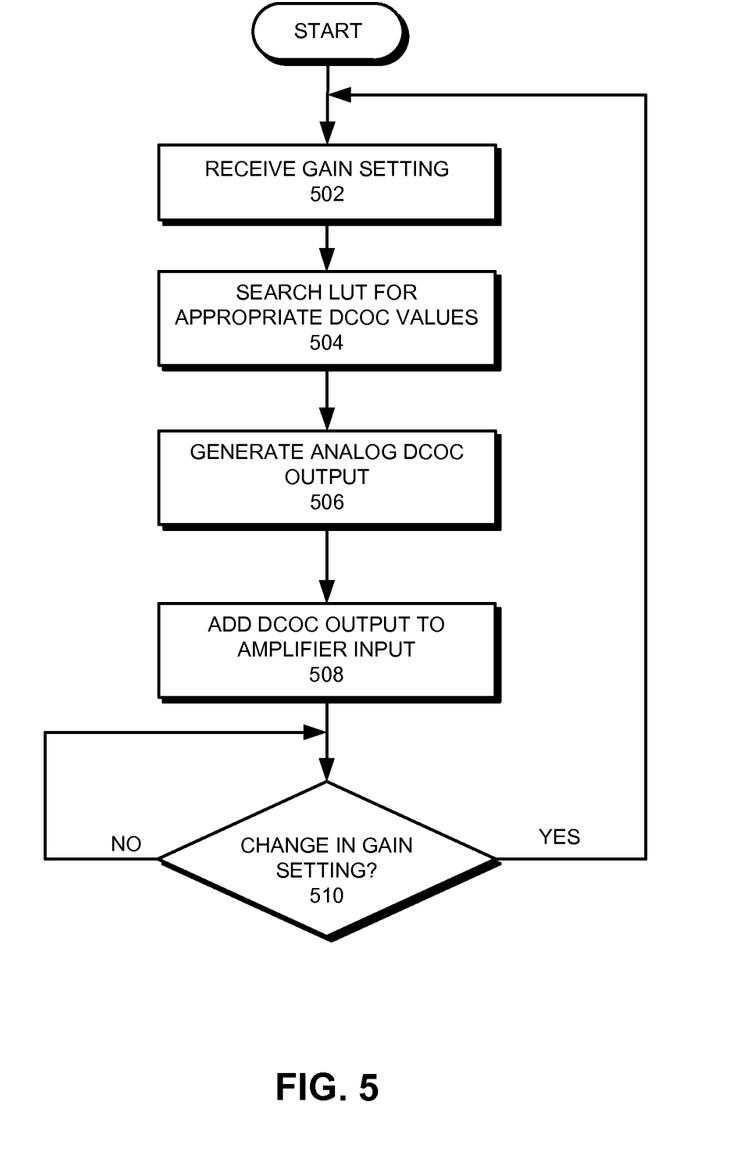
FIG. 5 presents a flowchart illustrating an exemplary static DCOC process under normal operating conditions, in accordance with an embodiment of the present invention.

Once initial calibration is done, the DCR can start normal operations and receive incoming RF signals. Based on the intensity of the received signal and current coding schemes, the gains are adjusted at each amplification stage. Once the gain setting is determined, the digital control logic searches the DCOC LUT to find the calibrated DCOC values for the current gain setting. The calibrated DCOC values are then used to generate an appropriate DCOC output that can be used to cancel the static DC offset. FIG. 5 presents a flowchart illustrating an exemplary static DCOC process under normal operating conditions, in accordance with an embodiment of the present invention. During operation, the system receives current gain setting (operation 502), and searches the DCOC LUT for DCOC values corresponding to the current gain setting (operation 504). Subsequently, the DCOC values are applied to the inputs of the DACs in the DCOC circuitries to generate an appropriate analog DCOC output (operation 506). Note that, in one embodiment, each amplification stage includes a DCOC circuit. The analog DCOC output is then applied to an adder, which sums the DCOC output and the amplifier input (operation 508). The system then determines whether the gain setting has been changed (operation 510). If not, the system waits for changes. If so, the system receives the updated gain setting (operation 502).

Dynamic DC Offset Cancellation

In addition to the static DC offset, which can be calibrated and cancelled by the aforementioned static DCOC scheme, under normal operating conditions, the DCR may also experience dynamic or time varying DC offset. The dynamic DC offset can include temperature-change-induced DC drift and signal-dependent DC offset. For example, as temperature changes the DC offset may drift away from the previously calibrated value. In addition, the static DCOC calibration is done at the absence of the incoming RF signal and does not account for various signal-dependent nonlinear effects, such as the Doppler spread of the channel, which can lead to additional DC offset in the case of orthogonal frequency-division multiplexing (OFDM) coding. The DCOC calibration results can only be used for cancellations of static DC offset. Additional schemes are needed for cancellations of the dynamic DC offset.

Figure 6A:
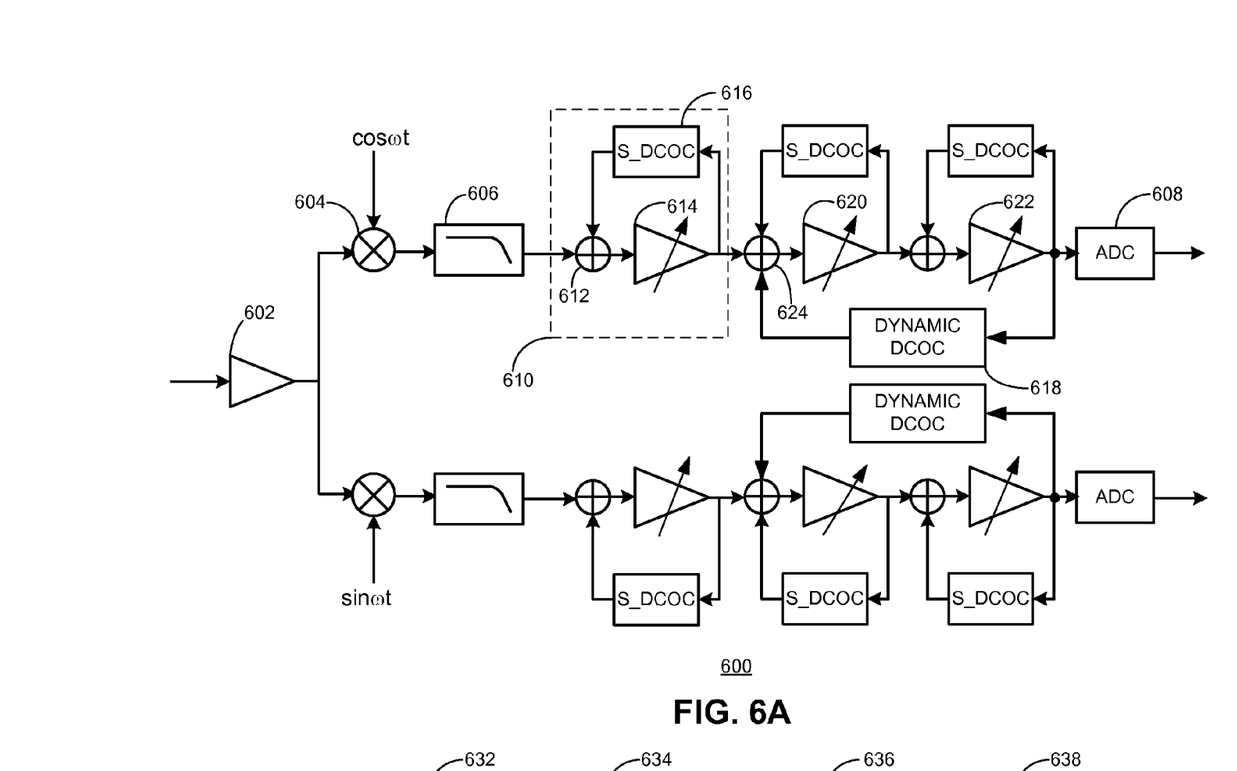
FIG. 6A presents a diagram illustrating an exemplary direct-conversion receiver with a dynamic DC offset cancellation circuit, in accordance with an embodiment of the present invention.

FIG. 6A presents a diagram illustrating an exemplary direct-conversion receiver with a dynamic DC offset cancellation circuit, in accordance with an embodiment of the present invention. In FIG. 6A, DCR 600 includes an LNA 602 and I and Q signal branches for IQ demodulation. Each branch includes a mixer (such as mixer 604), an LPF (such as LPF 606), a number of amplification stages, and an ADC (such as ADC 608). Each amplification stage includes a static DCOC circuit to compensate for static DC offset. For example, amplification stage 610 includes an adder 612, a VGA 614, and a DCOC circuitry 616. Note that, although exemplary receiver 600 includes three amplification stages, in practice, receiver 600 can include more or fewer such stages. As discussed in the previous paragraph, the static DCOC circuits compensate static DC offset using previously calibrated DCOC values. To provide dynamic DCOC, each of the I and Q branches of receiver 600 also includes at least one dynamic DCOC circuit that forms a closed loop with one or more amplification stages. For example, a dynamic DCOC circuit 618 forms a closed loop with the last two amplification stages that include amplifiers 620 and 622.

Note that because the amplitude of the dynamic DC offset is often small, especially at the initial amplification stages (such as the one that includes VGA 614) compared with the static DC offset, it is not necessary to compensate for dynamic DC offset at each amplification stage. In the example shown in FIG. 6A, the foremost amplification stage is not dynamically compensated for DC offset. On the other hand, after being amplified by the initial amplification stages, the dynamic drift in the DC offset can be no longer negligible, and needs to be compensated. In one embodiment, the gain setting of the amplifiers determines which stage or stages need to be compensated dynamically for DC offset. Dynamic DC offset compensation only applies to amplification stages that come after the initial stages have an accumulated gain above a threshold value. In one embodiment, the dynamic compensation of DC offset is provided at the last one or more amplification stages. In a further embodiment, a single dynamic DCOC circuit can be configured to provide DCOC for multiple amplification stages. In the example shown in FIG. 6A, the last two amplification stages before the ADC are dynamically compensated for DC offset using a single dynamic DCOC circuit. For example, dynamic DCOC circuit 618 provides dynamic DC offset compensation for both amplifiers 620 and 622.

Figure 6B:
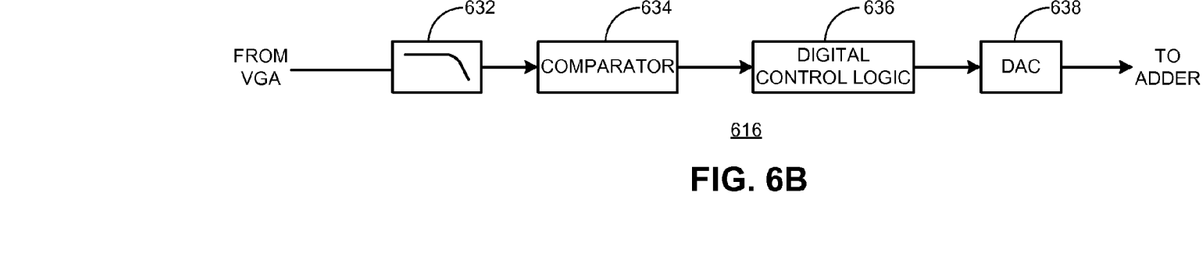
FIG. 6B presents a diagram illustrating an exemplary dynamic DC offset cancellation circuitry, in accordance with an embodiment of the present invention.

FIG. 6B presents a diagram illustrating an exemplary dynamic DC offset cancellation circuitry, in accordance with an embodiment of the present invention. DCOC circuitry 616 includes an LPF 632, a comparator 634, a digital control logic 636, and a DAC 638. As shown in FIG. 6B, LPF 632 receives input from the output of a VGA or a chain of VGAs. Dynamic DCOC circuitry 616 shares many similarities with static DCOC circuitry 222. Their main difference includes the bandwidth difference between LPF 632 (shown in FIG. 6B) and LPF 242 (shown in FIG. 2B). Because dynamic DCOC is performed with the presence of the RF signal (received via an antenna and amplified by LNA 602), the noise level is much higher, thus requiring an LPF with a narrower passing band. In one embodiment, the passing band of LPF 632 can be at least 10 times narrower than that of LPF 242. For example, LPF 242 may have a bandwidth of 30 kHz, and LPF 632 may have a bandwidth of 3 kHz or 300 Hz. Such a narrower bandwidth can lead to a relatively long settling time for LPF 632. Hence, a longer time duration may be needed to obtain multiple readings of the output of comparator 634, which can be a thresholder. In one embodiment, digital control logic 636 reads the output of comparator 634 multiple times within a predetermined time duration, and counts the number of "1"s and "0"s outputted by comparator 634 to determine whether a positive or negative DC offset is present. Based on the determination, digital control logic 636 may make a small adjustment to its DCOC estimation value, and outputs the DCOC estimation value to DAC 638, which converts the DCOC estimation value to an analog signal. The converted analog signal is then fed back to the input of the VGA or chain of VGAs via an adder, thus providing dynamic DC offset compensation. In the example shown in FIG. 6A, the output of dynamic DCOC circuitry 618 is fed back to the input of amplifier 620 via an adder 624. Note that this process is similar to the static DCOC calibration. However, to ensure that any DC offset compensation does not disturb the original RF signal, it is desirable to adjust the DCOC estimation value by a minimal step each time a DC offset is detected dynamically. Even when a multi-bit comparator is used, making it possible to measure the amount of DC offset, digital control logic 636 does not adjust the DCOC estimation value using the full amount of the measurement. Instead, digital control logic 636 fine-tunes the DCOC estimation value by making small adjustments which can be a fraction of the measured amount to avoid possible distribution to the received radio signal. Hence, multiple iterations may be needed to fully compensate the detected DC offset. Note that due to the slow nature of temperature drifting, the temperature-change-induced DC offset often drifts slowly as well. Consequently, using multiple iterations to provide dynamic DCOC can be adequate. Also note that, unlike static DCOC circuitry 222, which no longer updates its DCOC output once initial calibration is done in an absence of the radio signals, dynamic DCOC circuitry 616 continuously measures the DC offset and updates its DCOC output during normal receiver operations with the presence of the radio signals.

Figure 7:
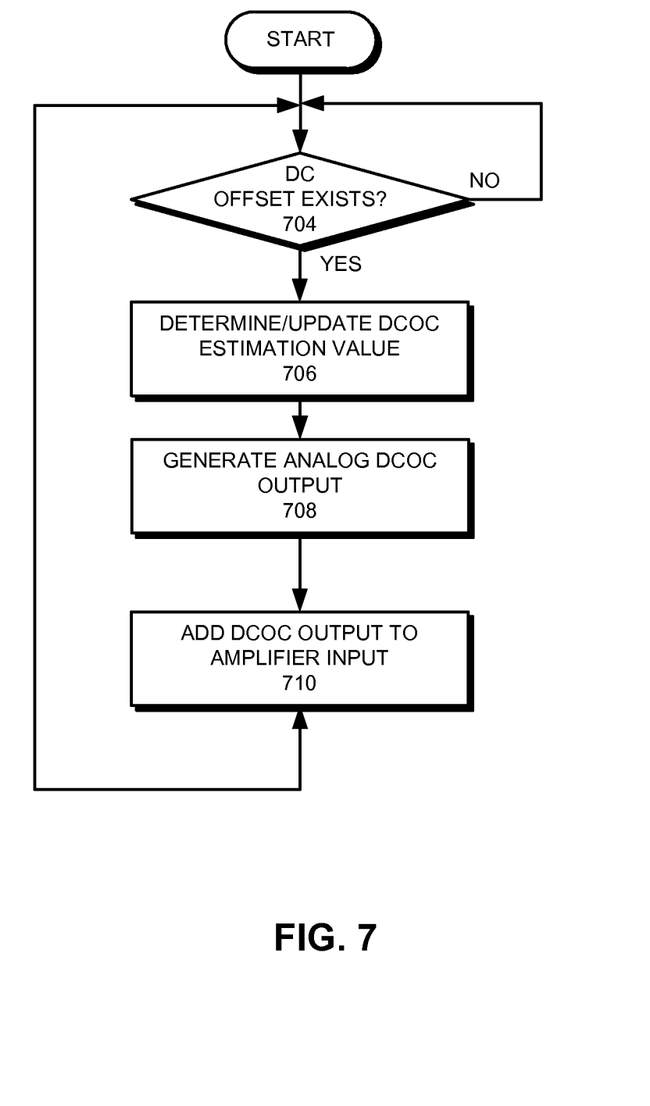
FIG. 7 presents a flowchart illustrating an exemplary dynamic DCOC process under normal operating conditions, in accordance with an embodiment of the present invention.

FIG. 7 presents a flowchart illustrating an exemplary dynamic DCOC process under normal operating conditions, in accordance with an embodiment of the present invention. During normal receiver operations, the dynamic DCOC circuitry in the receiver determines whether a DC offset exists (operation 704). Note that it is assumed that static DCOC has been applied here. In one embodiment, a narrow-band LPF and a comparator are used to determine the presence of the additional (in addition to static ones) DC offset at the output of a VGA or a chain of VGAs. In a further embodiment, the comparator is a thresholder. If no DC offset is detected, the receiver waits (operation 704). If additional DC offset is detected, a DCOC estimation value is determined or updated (operation 706). In one embodiment, to avoid distribution to the RF signal (which may lead to increased bit-error rates for the received signal), the change to the DCOC estimation value is kept sufficiently small. For example, if the detected DC offset is positive, the change to the DCOC estimation value can be a small negative number, or the DCOC estimation value is decreased slightly. In a further embodiment, the change to the DCOC estimation value is a fraction of the detected DC offset. The receiver then generates an analog DCOC output using the updated DCOC estimation value (operation 708), and adds the analog DCOC signal to the input of the VGA or chain of VGAs (operation 710). Subsequently, the process repeats itself by determining whether DC offset exists (operation 704). In one embodiment, this process is performed periodically, and the period is determined based on the settling time of the narrow-band LPF filter within the dynamic DCOC compensation circuitry. Note that the dynamic DCOC process is performed concurrently with the RF signal receiving process, thus providing continuous compensation of the dynamic DC offset while receiving incoming RF signals.

In general, compared with traditional track-and-hold DC offset compensation schemes where DC offset is tracked during a receiving time slot and corrected during a transmitting time slot, embodiments of the present invention provide continuous DC offset compensation and, thus can be applied to various channel-access schemes other than time division multiple access (TDMA).

Note that the architectures shown in FIGS. 2A-2B and 6A-6B are merely exemplary and should not limit the scope of this disclosure. For example, in the figures IQ demodulators are used for signal demodulation. In practice, other types of demodulating schemes are also possible.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for performing DC offset cancellation for a wireless receiver comprising one or more amplification stages between a demodulator and a baseband digital signal processor (DSP), comprising:
    calibrating values of static DC offset associated with a plurality of gain settings for at least one amplification stage;
    storing the calibrated DC offset values in a lookup table;
    receiving a current gain setting for the amplification stage;
    mapping a DC offset value from the lookup table based on the current gain setting; and
    canceling static DC offset for the amplification stage using the mapped DC offset value.

2. The method of claim 1, wherein calibrating the values of static DC offset is performed when the wireless receiver is powered on, in an absence of incoming RF signals at the at least one amplification stage's input.

3. The method of claim 1, further comprising:
    receiving incoming RF signals; and
    continuously performing a dynamic DC offset cancellation operation in a presence of the received RF signals.

4. The method of claim 3, wherein performing the dynamic DC offset cancellation involves forming a closed loop that includes one or more amplification stages closest to the baseband DSP.

5. The method of claim 1, wherein calibrating the static DC offset involves forming a closed loop using a DC offset cancellation circuit and the at least one amplification stage, wherein the DC offset cancellation circuit is configured to:
    receive an output from the at least one amplification stage;
    generate a DC offset cancellation signal based on the output received from the at least one amplification stage; and
    feed the generated DC offset cancellation signal to an input of the amplification stage.

6. The method of claim 5, wherein while generating the DC offset cancellation signal, the DC offset cancellation circuit is further configured to:
    determine whether the output received from the at least one amplification stage is approximately zero; and
    in response to the output being not approximately zero, update the DC offset cancellation signal.

7. The method of claim 1, wherein the wireless receiver is a direction-conversion receiver.

8. A wireless receiver, comprising:
    a demodulator;
    a baseband digital signal processor (DSP);
    one or more amplification stages situated between the demodulator and the baseband DSP; and
    a static DC offset cancellation circuit coupled to at least one amplification stage, wherein the static DC offset cancellation circuit is configured to:
        calibrate values of static DC offset associated with a plurality of gain settings for the at least one amplification stage;
        store the calibrated DC offset values in a lookup table;
        map a DC offset value from the lookup table based on a current gain setting; and
        cancel static DC offset for the amplification stage using the mapped DC offset value.

9. The wireless receiver of claim 8, wherein the static DC offset cancellation circuit is configured to calibrate the static DC offset values when the wireless receiver is powered on, in an absence of incoming RF signals at the at least one amplification stage's input.

10. The wireless receiver of claim 8, further comprising a dynamic DC offset cancellation circuit configured to continuously perform a dynamic DC offset cancellation operation in a presence of incoming RF signals received by the wireless receiver.

11. The wireless receiver of claim 10, wherein while performing a dynamic DC offset cancellation operation, the dynamic DC offset cancellation circuit forms a closed loop with one or more amplification stages closest to the baseband DSP.

12. The wireless receiver of claim 8, wherein while calibrating the static DC offset, the static DC offset cancellation circuit forms a closed loop with the at least one amplification stage; and
    wherein the DC offset cancellation circuit further comprises:
        a receiving mechanism configured to receive an output from the at least one amplification stage;
        a signal generator configured to generate a DC offset cancellation signal based on the output received from the at least one amplification stage; and
        a signal output mechanism configured to feed the generated DC offset cancellation signal to an input of the amplification stage.

13. The wireless receiver of claim 12, wherein the DC offset cancellation circuit further comprises:
    a determination mechanism configured to determine whether the output received from the at least one amplification stage is approximately zero; and
    a signal updating mechanism configured to, in response to the output not being approximately zero, update the DC offset cancellation signal.

14. The wireless receiver of claim 8, wherein the demodulator is a direct conversion demodulator.

15. A DC offset cancellation circuit for cancelling DC offset received at an amplifier, comprising:
    a low-pass filter (LPF) coupled to an output of the amplifier;
    a comparator coupled to the LPF;
    a digital logic configured to:
        determine whether the LPF's output is approximately zero based on the comparator's output;
        store a DC offset estimation value; and
        update the stored DC offset estimation value in response to determining that the LPF's output is not approximately zero;
    a DC offset cancellation signal generator configured to generate a DC offset cancellation signal based on the updated DC offset estimation value; and
    an adder configured to add the DC offset cancellation signal to an input of the amplifier, thereby facilitating DC offset cancellation for the amplifier.

16. The DC offset cancellation circuit of claim 15, wherein the comparator is a thresholder, and wherein while determining whether the LPF's output is approximately zero, the digital logic is configured to determine a ratio of positive outputs to negative outputs of the thresholder.

17. The DC offset cancellation circuit of claim 15, wherein the digital logic is further configured to store a current DC offset estimation value in a lookup table in response to determining that the LPF's output is approximately zero, wherein the current DC offset estimation value is indexed in the lookup table by a current gain setting of the amplifier.

* * * * *